United States Patent [19]

Savarese

[11] Patent Number: 5,516,386
[45] Date of Patent: May 14, 1996

[54] METHOD FOR MAKING A FLOATING SOLAR HEATING COVER FOR SWIMMING POOLS

[76] Inventor: Michael Savarese, 929 Main St., Melrose, Mass. 02176

[21] Appl. No.: 248,698

[22] Filed: May 25, 1994

[51] Int. Cl.⁶ .......................... B29C 65/02; B32B 31/20
[52] U.S. Cl. .................. 156/210; 156/285; 156/292; 156/308.4; 156/324
[58] Field of Search ...................... 156/145, 210, 156/285, 308.2, 308.4, 292, 461, 462, 470, 471, 498, 499, 553, 555, 329; 126/624, 625, 626, 561, 565, 566

[56] References Cited

U.S. PATENT DOCUMENTS

| | | | |
|---|---|---|---|
| 3,158,181 | 11/1964 | Gore | 156/553 |
| 3,574,035 | 4/1971 | Denks | 156/292 |
| 4,056,418 | 11/1977 | Aspin | 156/145 |
| 4,169,344 | 10/1979 | Ganz et al. | 156/145 |
| 4,256,087 | 3/1981 | Sowers | 126/565 |
| 4,488,929 | 12/1984 | Ostertag | 156/553 |
| 5,188,691 | 2/1993 | Caputo | 156/145 |

FOREIGN PATENT DOCUMENTS

| | | |
|---|---|---|
| 23285 | 2/1981 | European Pat. Off. . |
| 2522683 | 12/1976 | Germany . |
| 2057673 | 4/1981 | United Kingdom . |

*Primary Examiner*—Michael W. Ball
*Assistant Examiner*—Richard Crispino

[57] ABSTRACT

A flexible, sheet-like solar heating cover is composed of at least one elongated, generally rectangular, plural-ply, laminated plastic cover section. Each cover section has opposite side edge margins and each such section defines between first and second plies of the cover section a pair of transverse headers at opposite ends of each section and a lateral series of longitudinal conduits extending between, and being in fluid communication with, the pair of headers. All adjacent cover sections have contiguous headers which are in fluid communication with each other so that liquid can flow from the header at one end of each cover section through the fluid conduits to the header at the other end of each cover section. Fluid connections are provided to the headers at opposite ends of the cover. A method and apparatus for making the cover are also disclosed.

5 Claims, 3 Drawing Sheets

METHOD FOR MAKING A FLOATING SOLAR HEATING COVER FOR SWIMMING POOLS

FIELD OF THE INVENTION

This invention relates to a low cost, flexible solar panel. It relates more particularly to a floating solar heating cover for swimming pools and to a method and apparatus for making such panels and covers.

BACKGROUND OF THE INVENTION

There exists a variety of different kinds of covers for swimming pools. Some covers consist simply of plastic sheets having grommets or tie-downs spaced around their perimeters for connection to fastening points at the edges of the swimming pool. Such covers do not really float on the surface of the water in the pool. They are used mainly to exclude leaves and other debris from the pool when the pool is not being used for a prolonged period. There also exist covers composed of a pair of plastic sheets which are laminated together to form small bubbles throughout the area of the cover. These bubbles contain trapped air and displace enough volume so that the cover can float on the surface of the water in the pool. In some cases, the covers may be given a dark color so that the covers are effective absorbers of sunlight for heating the underlying water in the swimming pool to some extent. However, considering the small surface-to-volume ratio of most swimming pools, that heating effect is minimal end is confined to a relatively thin layer of water just below the cover.

It is also been known to use conventional rigid solar panels to heat water in swimming pools. Such panels are usually positioned near the pool and are included in the water circulation loop serving the pool. However, such solar panel installations are usually quite expensive, visually intrusive and occupy a relatively large amount of space.

SUMMARY OF THE INVENTION

Accordingly, it is an object of the present invention to provide a swimming pool cover which can also function as a flexible solar panel.

Another object of the invention is to provide a swimming pool cover of this type which can float on the surface of the water in the pool.

A further object of the invention is to provide such a swimming pool cover which is relatively inexpensive to make.

Yet another object of the invention is to provide an improved method of making a flexible solar heating cover for a swimming pool.

A further object of the invention is to provide apparatus for making a flexible solar heating cover for a swimming pool.

Other objects of the invention will, in part, be obvious and will, in part, appear hereinafter.

The invention accordingly comprises the several steps and the relation of one or more such steps with respect to each of the others, the apparatus embodying the features of construction, combination of elements and arrangement of parts, which are adapted to effect such steps, and the article which possesses the characteristics, properties and relation of elements all as exemplified in the following detailed disclosure, and the scope of the invention will be indicated in the claims.

Briefly, my cover is composed of one or more longitudinal sheet-like sections which can be served from a roll. Each cover section is composed of one or more segments arranged along the cover section. The length of a given section varies with the length of the swimming pool to be covered. As will be seen, a selected number of equal-length cover sections may be connected together side-by-side to cover the width of the pool.

Each cover section comprises a pair of co-extensive dark colored plastic sheets which are laminated to define between the plastic sheets transverse headers which are spaced apart along the cover section, as well as longitudinal tubes which are spaced apart across the cover section and which extend between and communicate with adjacent pairs of headers.

The plastic sheets of each two ply cover section are not laminated at the margins of that section until the sections are assembled to form the finished cover. During such assembly, the un-laminated margins of adjacent sections are permanently secured together in such a way that fluid communication is provided between the headers of adjacent sections. Thus, when the cover is completed, the corresponding transverse headers of all of the cover sections are in fluid communication. Also at that time, the plastic sheets at the longitudinal edge margins of the two outer sections comprising the cover are bonded together to finish those edges, as well as to connect the inlet and outlet ports to the headers at opposite ends of the cover.

In one embodiment, the cover may be superimposed on a conventional bubble-type floating pool cover to provide a solar heating capability. In another embodiment, the floating capability is incorporated right into the solar panel cover by forming flotation bubbles in the cover. In both embodiments, the inlet pipe to the cover may be connected by a length of tubing to one of the pressure ports which delivers water into the pool. The cover outlet pipe may be connected to a similar tube which simply hangs down to a point near the bottom on the pool. As long as the cover is deployed thusly, pool water will be circulated through the many small tubes in the cover and be heated relatively efficiently by the sunlight.

The cover sections may be made quite inexpensively using the laminating apparatus to be described in detail later. Suffice to say at this point that the apparatus includes a pair of laminating rolls at least one of which is grooved to accommodate a series of spaced-apart parallel spreader members. A pair of plastic sheets comprising each cover section are fed between the rolls and around the spreader members to form the lengthwise laminations in the cover section that define the tubular passages therein. Interruption of that laminating process periodically forms the headers in the cover section. Thus, using my manufacturing process and apparatus, large pool covers composed of one or more identical cover sections can be fabricated using relatively low cost lamination apparatus. Therefore, the overall cost of the pool cover is minimized.

While the invention has particular application to providing solar heating covers for swimming pools, it can also be implemented to form low cost, flexible solar heating panels for heating water and other liquids at campsites and other remote locations.

BRIEF DESCRIPTION OF THE DRAWINGS

For a fuller understanding of the nature and objects of the invention, reference should be had to the following detailed description taken in connection with the following drawings, in which.

DETAILED DESCRIPTION OF ILLUSTRATIVE EMBODIMENTS

Figure 1:
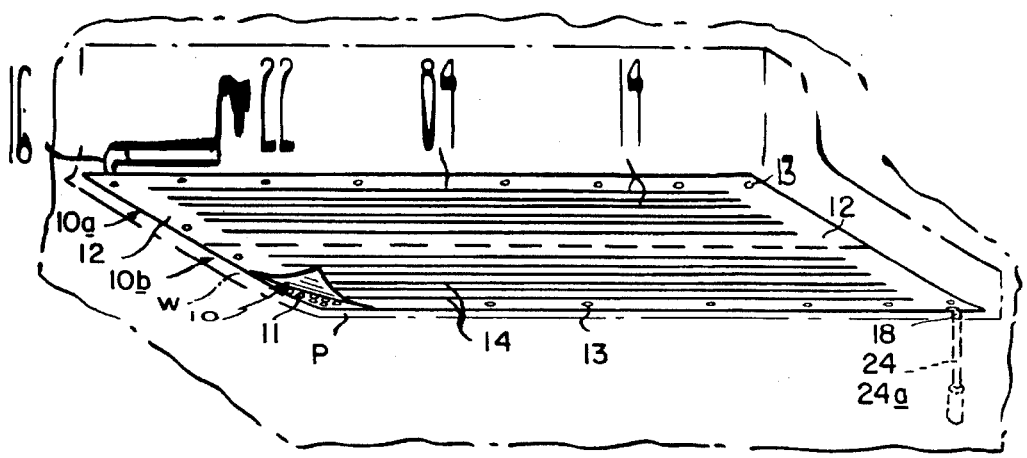
FIG. 1 is a diagrammatic view showing my solar heating cover deployed on a swimming pool.

Referring to FIG. 1 of the drawings, my solar heating swimming pool cover is shown generally at 10 superimposed on a conventional buoyant bubble-type pool cover 11 which is floating on the surface of water W in a conventional swimming pool P. Covers 10 and 11 may be connected to each other at their perimeters through grommets 13 spaced around the edge margins of the covers.

Cover 10 is a flexible laminated plastic sheet composed of two plies which define a series of at least two transverse headers 12 which are spaced along cover 10 and a transverse series of relatively small (e.g., 3/16" diam.) lengthwise passages 14, which passages 14 extend between and communicate with adjacent headers 12. An inlet pipe 16, e.g., an elbow, is connected to one end of the header 12 at one end of cover 10, while an outlet pipe 18 is connected to one end of the header at the other end of the cover.

As we shall see, the cover 10 is usually composed of a plurality of lengthwise cover sections 10a, 10b, etc. extending substantially the full length of the pool P, which sections are connected together side-by-side more or less to cover the width of the pool. The illustrated cover 10 is composed of only two sections 10a and 10b. Obviously, a larger number of sections would be used to cover a wider pool. In use, pool water may be circulated through cover 10 by connecting the inlet port 16 to one end of a flexible tube 22 whose other end is connected to one of the pool's water delivery passage ports which delivers water into the pool under pressure. The cover's outlet port 18 may be connected to a second similar tube 24 which hangs down into the pool. If desired, a diffuser 24a may be provided at the lower end of that tube.

When not in use, the covers 10 and 11 may be rolled up together on a pole (not shown) at one end of the pool or be folded up and removed completely, as desired.

Figure 3:
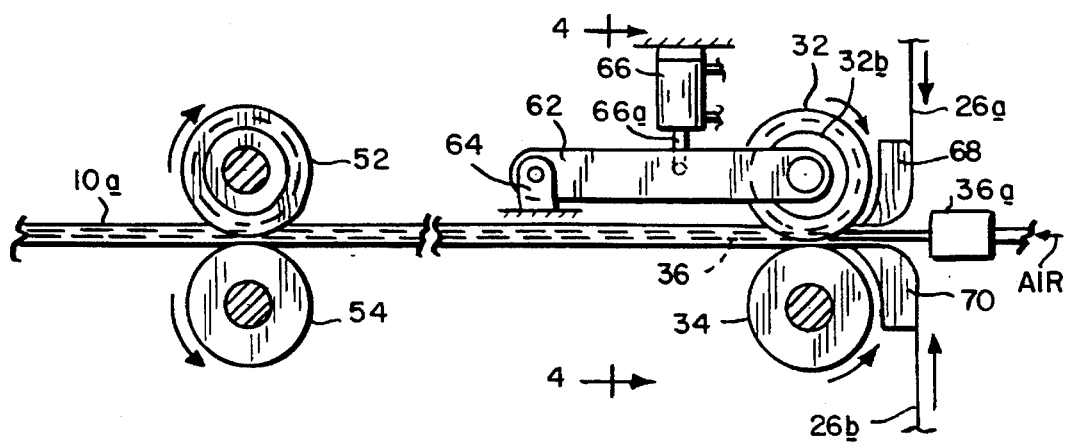
FIG. 3 is a side elevational view illustrating apparatus for making the FIG. 1 cover.
Figure 4:
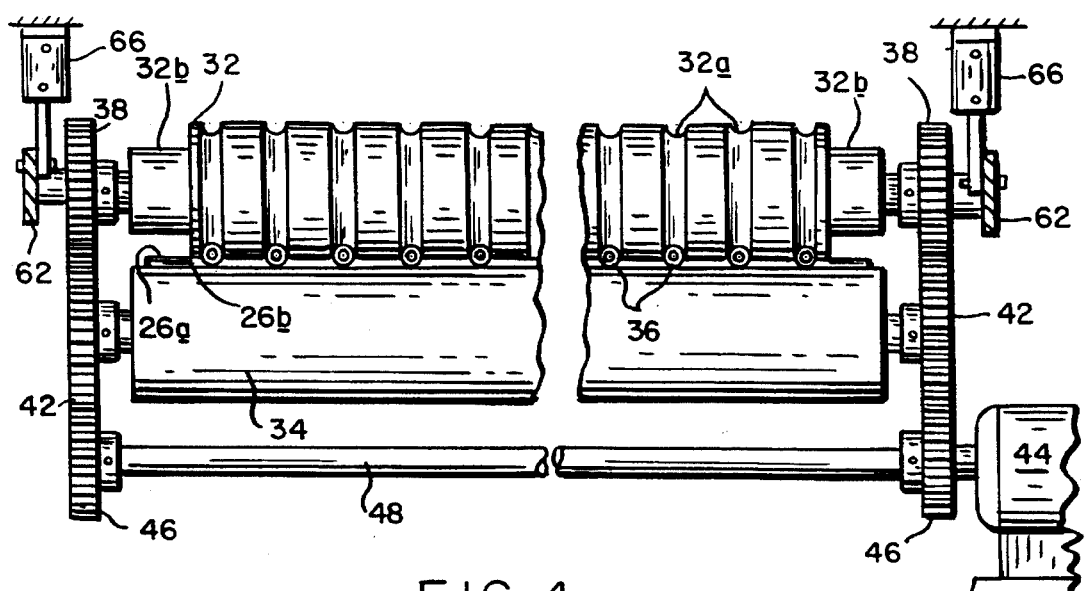
FIG. 4 is a sectional view taken along line 4—4 of FIG. 3.
Figure 2:
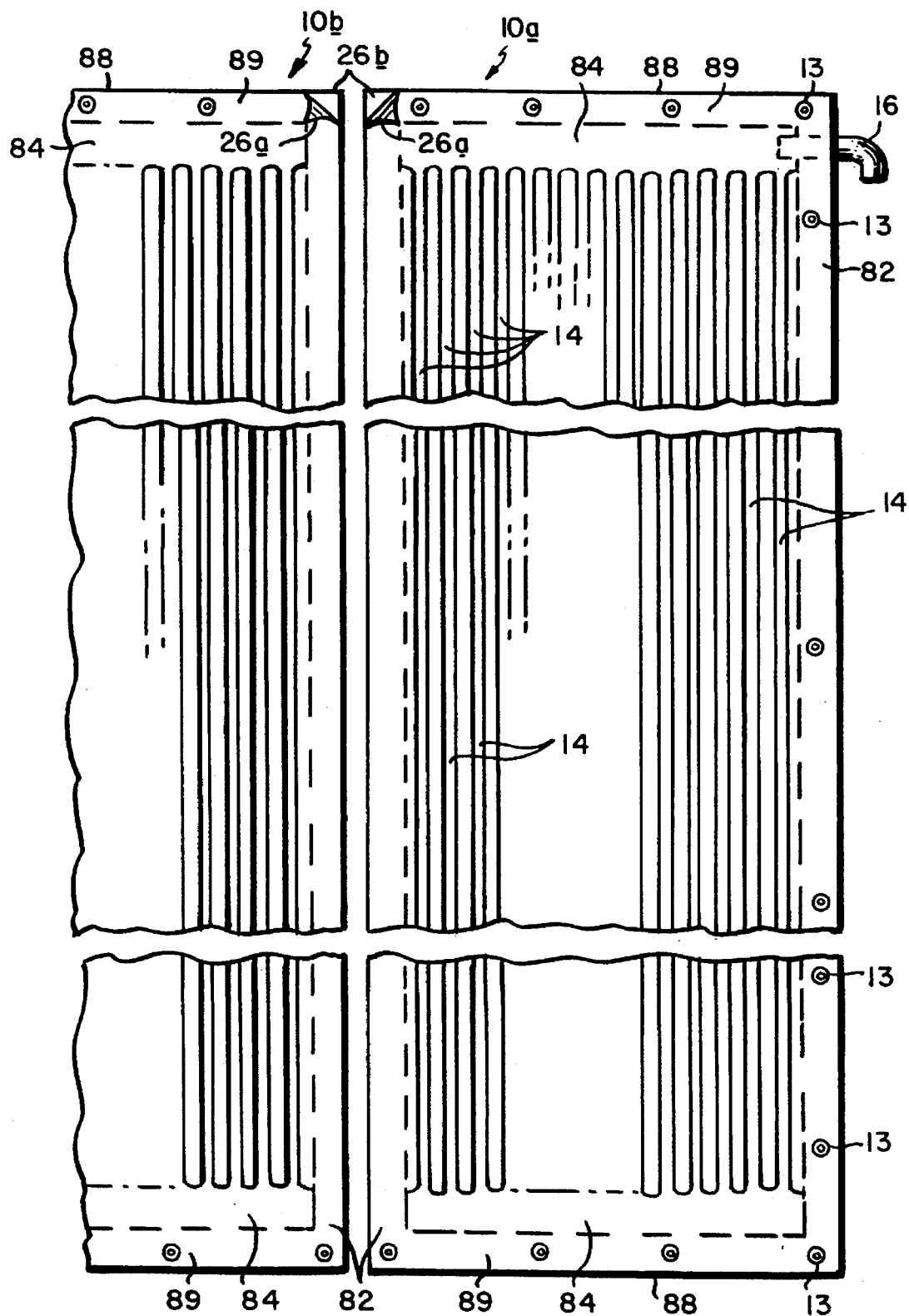
FIG. 2 is a plan view with parts broken away and on a much larger scale showing the cover in greater detail.

As shown in FIG. 2 of the drawings, each cover section 10a, 10b, etc. is comprised of co-extensive, flexible plastic sheets 26a and 26b which are laminated by the apparatus depicted in FIGS. 3 and 4 to form the headers 12 and fluid passages 14. Both sheets are strong and tear resistant, e.g. 4 mil polyethylene or 5 mil polethylene terephthalate would be a suitable sheet material. At least one of the sheets, preferably top sheet 26a, should be colored dark blue or black so that it is a good absorber of sunlight.

Referring to FIGS. 3 and 4, the apparatus depicted there comprises a pair of upper and lower metal laminating rolls 32 and 34. Roll 32 is provided with circumferential grooves 32a spaced apart along the length of that roller to provide clearance for a transverse series of straight spreader members 36, (e.g., 3/32" diam.), which extend to just beyond the roll nip. In other words, each groove 32a is deep enough to accommodate the entire cross section of the corresponding rod 36. Roll 32 also has reduced diameter end segments 32b for reasons that will become apparent. Spreader members 36 may be wire rods. More preferably, however, they are stainless steel tubes coated with PTFE and connected to a header 36a supplied with air under pressure.

Roll 34 is a simple cylinder. The two rolls 32 and 34 are geared together by gears 38, 38 and 42, 42, with the rolls being driven by a motor 44 by way of gears 46, 46 of a gear shaft 48 rotated by motor 44.

A second pair of rolls 52 and 54, similar to rolls 32 and 34, are spaced along rods 36 from rolls 32 and 34. These rolls are rotated in synchronism with rolls 32 and 34. They are simply draw rolls and do not contribute to the laminating process.

As best seen in FIG. 3, means are provided for moving roll 32 into and out of engagement with roll 34. In the illustrated apparatus, this is accomplished by mounting the opposite ends of the roller 32 shaft to corresponding first ends of a pair of arms 62 whose opposite ends are pivotally connected to pillow blocks 64 mounted to the machine frame. A pair of double acting pistons 66, also mounted to the machine frame, have their armatures 66a pivotally connected to the corresponding arms 62. Normally, pistons 66 press roll 32 against roll 34 to form a nip. However, when fluid is applied to the lower ends of piston cylinders, the pistons retract their respective rods 66a thereby moving the roll 32 away from roll 34.

Also as shown in FIG. 3, a pair of heater shoes 68 and 70 are mounted adjacent to rolls 32 and 34, respectively. Shoes 68 and 70 extend the entire lengths of rolls 32 and 34 so that they are in position to heat a pair of plastic sheets 26a and 26b guided into the nip of rolls 32 and 34 as shown in FIG. 3. Alternatively, rolls 32 and 34 may be heated rolls about which sheets 26a and 26b are wrapped sufficiently to be heated to a soft state.

During operation of the laminating apparatus, rolls 32 and 34 are normally in contact so that sheets 26a and 26b are drawn through the nip of those rolls. Prior to passing through the nip, those sheets are heated by the heating shoes 68 and 70 (or rolls 32 and 34) so that when the sheets encounter the high pressure at the roll nip, they become laminated or bonded together except where they are held apart by the spreader members 36 and at the longitudinal edge margins of the sheets which lie opposite the reduced diameter roll end segments 32b which apply no pressure to the sheets. As the plastic sheets 26a and 26b are advanced to the second pair of rolls 52 and 54, they are cooled by the air flowing through the spreader members 36, the air also holding the sheets 26a and 26b apart at passages 14 thereby forming the two ply structure depicted in FIG. 2 having longitudinal passages 14 and un-laminated side edge margins indicated at 82 in FIG. 2. It should be understood that there is sufficient clearance between the spreader members 36 and the walls of passages 14 to permit the air to escape and so avoid excessive pressure build up in the passages.

Periodically, the pistons 66 are actuated momentarily to retract roll 32 away from roll 34 so that no pressure is applied to the heated sheets 26a and 26b. Resultantly, those sheets are not laminated at all across their entire widths thereby leaving transverse gaps 84 in the otherwise laminated sheets. These gaps 84 extend the full width of the sheets and are equally spaced apart along the length of the cover section 10a or 10b as shown in FIG. 2. Furthermore, these lamination gaps 84 between sheets 26a and 26b communicate with the passages 14 formed between those sheets by the rods 36.

Referring to FIG. 2, a cover section of indeterminate length formed as aforesaid may be stored on a roll until needed. When assembling a pool cover, a cover section, e.g., section 10a, of the proper length to suit the pool being covered can be drawn from the roll and cut at a transverse cut line 88. Similar lengths of material may be drawn from the roll to provide the number of cover sections required to span the width of that pool, i.e., a second section 10b in the illustrated example. The two sections 10a and 10b are shown side-by-side in FIG. 2.

Then, the adjacent lower plastic sheets 26b of the unlaminated edge margins 82 of cover sections 10a and 10b may be overlapped and laminated to secure them together. Following that, the upper plastic sheets 26a of those same edge margins 82 may be overlapped and laminated in a similar fashion, with a suitable insulating spacer being provided between sheets 26a and 26b. This process connects together the two cover sections 10a and 10b, but maintains communication between the un-laminated transverse portions 84 that will form the headers 12 in the finished product.

Next, the opposite end edge margins 89 of the plastic sheets 26a and 26b of the secured-together cover sections are bonded together adjacent to the cut lines 88 to form the transverse headers 12 at the opposite ends of the cover sections.

Finally, the plastic sheets 26a and 26b at the outside edge margins 82 of the two cover sections 10a and 10b are bonded together or laminated to finish the outside edge margins of the cover and to close the ends of the headers 12. During this process, the cover inlet pipe 16 and outlet pipe 18 may be seamed into those edge margins so that they communicate with their respective headers 12.

Thus, each cover section 10a, 10b consists of a lengthwise segment which includes an array of longitudinal passages 14 bracketed by un-laminated segments 84 which form the headers 12 at opposite ends of the cover section.

When the solar heating cover 10 is superimposed on the flotation cover 11 and secured thereto at grommets 13 (FIG. 1), it provides a flexible, floating relatively efficient solar heater for enabling the water W in pool P to be heated by sunlight.

The rectangular cover 10 may also be used to cover and heat a free form pool or one with somewhat larger dimensions by providing a non-solar heating border around cover 10 which is shaped to the pool. That border is preferably made of flotation-type cover material and is stitched or otherwise secured to the edge margin of cover 10.

It should also be understood that the cover 10 can be used by itself as a solar panel to heat water for washing or bathing at a campsite or other location that does not have facilities for heating. Because the cover 10 is relatively lightweight and can be rolled up or folded, it is easily transported from place to place and can be stored in a minimum amount of space. Further, its only two ply plastic construction makes the cover relatively easy to make to any desired width using the illustrated apparatus.

Figure 5:
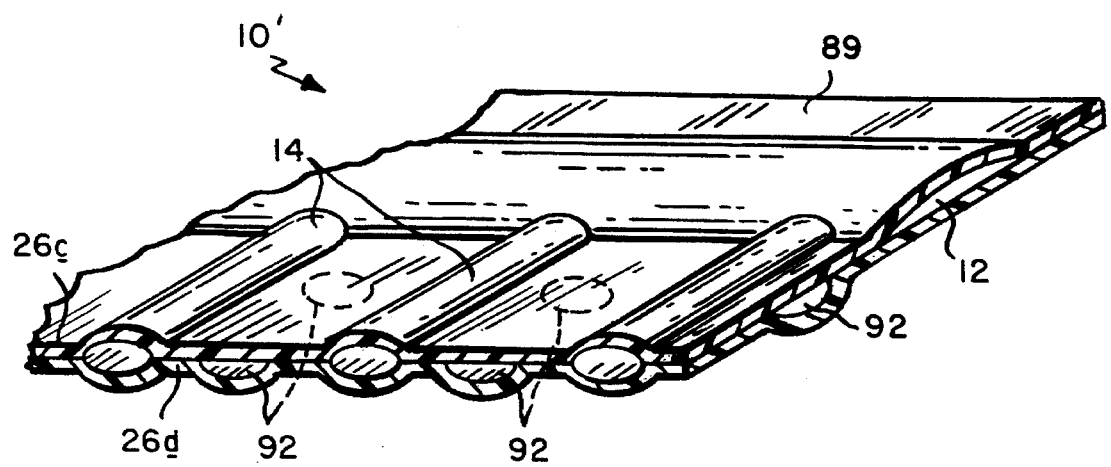
FIG. 5 is a fragmentary perspective view of another cover embodiment.
Figure 6:
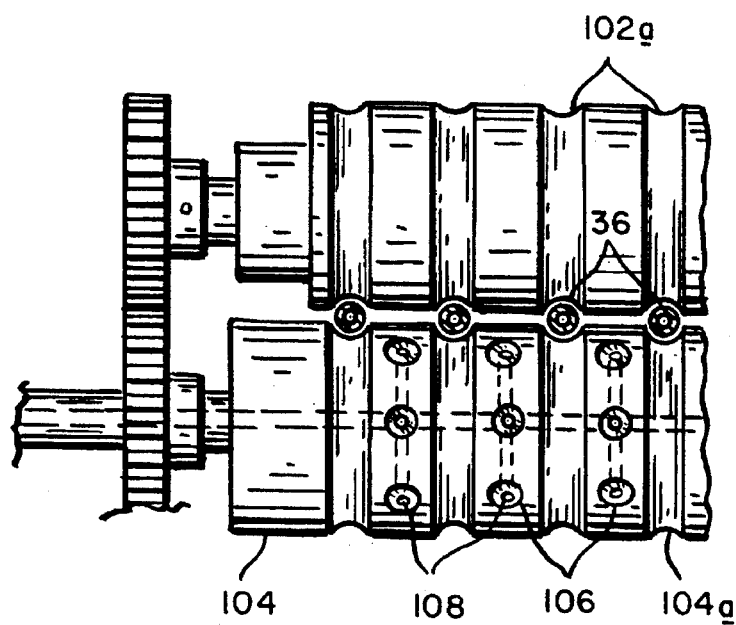
FIG. 6 is a view similar to FIG. 4 of apparatus for making the FIG. 5 cover.

My solar heating cover can also be made so that the flotation function is built directly into the cover. A portion of a cover such as this is illustrated generally at 10' in FIG. 5 and the apparatus for making same as shown in FIG. 6. As seen in FIG. 5, cover 10' comprises a pair of plastic sheets 26c and 26d which are laminated to form the headers 12 and fluid passages 14 as described above. Also formed in the plastic sheet 26d is an array of small flotation bubbles 92 which are distributed over the entire surface of sheet 26d between passage 14. These bubbles, which may be round or elongated, contain trapped air and displace sufficient volume to enable the cover 10' to float on a body of water. Thus, cover 10' has all of the advantages of the combined covers 10, 11 described above. However, it is further advantaged in that it can be fabricated using only two plies. Therefore, it is less costly to manufacture. Furthermore, it is lighter and more flexible than the combined covers.

As seen in FIG. 6, the apparatus for forming the FIG. 5 cover comprises a pair of laminating rolls 102 and 104. Roll 102 may be similar to roll 32, but with grooves 102a spaced further apart than grooves 32a. Roll 104, on the other hand, is formed with grooves 104a opposite grooves 102a and dimples or cavities 106 between grooves 104a each of which has a passage 108 at its bottom which connects with an axial passage 110 in the shaft of that roll. Passage 110 may be connected to a vacuum source (not shown) so that a vacuum may be drawn in each dimple 106. In other words, each dimple may function as a vacuum mold for shaping a plastic sheet 26d guided into the nip of rolls 102 and 104 to form the flotation bubbles 92 in the cover 10 shown in FIG. 5. As before, spreader members 36 are present to form passages 14. In this case, however, those members are received in the grooves 102a, 104a of both rolls 102, 104 so that material from both plastic sheets 26c, 26d are used to form passages 14.

It will thus be seen that the objects set forth above, among those made apparent from the preceding description, are efficiently attained and, since certain changes may be made in carrying out the above process, in the described product, and in the construction set forth without departing from the scope of the invention, it is intended that all matter contained in the above description or shown in the accompanying drawings shall be interpreted as illustrative and not in a limiting sense.

It is also understood that the following claims are intended to cover all of the generic and specific features of the invention described herein.

Having described my invention, what is claimed as new and secured by Letters Patent is:

1. The method of making a solar heating cover comprising the steps of juxtaposing a pair of rollers, at least one of which is circumferentially grooved, to form a nip;

positioning substantially straight spreader members between said rollers so that the spreader members extend through the nip at said grooves;

guiding a pair of plastic sheets, each sheet having opposite side edge margins, through the nip on opposite sides of said spreader members;

heating the sheets prior to their passing through the nip;

rotating the rollers to advance the sheets through the nip so that the sheets become laminated except at the spreader members where longitudinal passages are formed between the sheets, and moving the rollers apart periodically to open the nip so as to form transverse headers between the sheets which are in fluid communication with said passages thereby forming a first solar heating cover section of indeterminate length.

2. The method defined in claim 1 including the additional steps of forming the spreader members as tubes, and supplying a fluid to said tubes so as to cool and pressurize the passages formed between said sheets.

3. The method defined in claim 1 including the additional steps of forming cavities in one of said rollers, said cavities being distributed about the circumference of said one roller and being located between said grooves, and drawing a vacuum in said cavities so as to form flotation bubbles between said sheets as they are advanced through the nip.

4. The method defined in claim 1 including the additional steps of forming a second similar cover section;

placing said first and second cover sections adjacent to one another so that side edge margins of the pair of plastic sheets comprising said first cover section are opposite side edge margins of the pair of plastic sheets comprising said section cover section, and overlapping and bonding together the opposite side edge margins of the corresponding plastic sheets comprising said first and second cover sections so as to provide a fluid-tight connection between the corresponding headers of said first and second cover sections.

5. The method defined in claim 4 including positioning conduits in the headers at the ends of the cover, and bonding the pairs of sheets together all around the perimeter of the cover.

\* \* \* \* \*